United States Patent [19]

Ushikubo

[11] Patent Number: 4,879,540
[45] Date of Patent: Nov. 7, 1989

[54] DATA EXCHANGING SYSTEM USING A BAR CODE READER

[75] Inventor: Kohei Ushikubo, Gunman, Japan

[73] Assignee: Sanden Corporation, Gunma, Japan

[21] Appl. No.: 271,411

[22] Filed: Nov. 14, 1988

Related U.S. Application Data

[63] Continuation of Ser. No. 931,799, Nov. 18, 1986, abandoned.

[30] Foreign Application Priority Data

Nov. 18, 1985 [JP] Japan .................................. 60-257982

[51] Int. Cl.⁴ .............................................. G06K 7/10
[52] U.S. Cl. ..................................... 235/385; 235/472
[58] Field of Search ................ 235/472, 383, 385, 375, 235/462

[56] References Cited

U.S. PATENT DOCUMENTS

| | | | |
|---|---|---|---|
| 4,423,319 | 12/1983 | Jacobse | 235/472 |
| 4,575,625 | 3/1986 | Knowles | 235/462 |
| 4,588,881 | 5/1986 | Pejas et al. | 235/385 |
| 4,608,487 | 8/1986 | Awane et al. | 235/472 |
| 4,736,096 | 4/1988 | Ushikubo | 235/472 |

Primary Examiner—A. D. Pellinen
Assistant Examiner—Leon K. Fuller
Attorney, Agent, or Firm—Banner, Birch, McKie & Beckett

[57] ABSTRACT

A data exchanging system, for exchanging data between electrical devices, such as, an automatic vending machine and a data collecting device, is disclosed. Each device includes a data delivery section for converting data into a signal resembling the light reflected by a bar code when the bar code is optically scanned, a data receiving section for receiving data in the form of optically coded signals, and a control device for controlling the operation of the data delivery section and decoding data provided from the data receiving section.

7 Claims, 2 Drawing Sheets

DATA EXCHANGING SYSTEM USING A BAR CODE READER

This application is a continuation of application Ser. No. 931,799, filed Nov. 18, 1986 now abandoned.

The present application is related by subject matter to U.S. Pat. No. 4,736,096 which issued Apr. 5, 1988 to the same inventory entitled "Data Collection System Using a Bar Code Reader."

RELATED APPLICATIONS

The present invention is related to U.S. application Ser. No. 821,952 entitled "Data Collection System Using a Bar Code Reader", filed Jan. 24, 1986. The two applications are in the name of the same inventor and are commonly owned.

BACKGROUND OF THE INVENTION

The present invention relates to a data exchanging system for transmitting data by optical coupling between electrical devices, and more particularly, to a system for transmitting data between a portable bar code reader and a plurality of remote vending machines.

Generally, data exchange between electrical equipment is performed by electric coupling. This coupling is classified into two types, such as, direct current (D.C.) coupling and alternating current (A.C.) coupling. D.C. coupling can be supplied at low cost, and hence, low price. However, D.C. coupling is easily influenced by electrical noise. A.C. coupling can be employed to reduce electrical interference, however, the cost to supply such systems is too high.

Alternatively, optical coupling may be used in a communication system for exchanging data. Optically coupled systems are usually used in equipment because these systems can be provided at low cost and are not affected by electrical interference. However, when data is to be exchanged between a plurality of systems, the format used for data transmission must be considered. This is because data can only be optically transmitted between devices which use the same data format.

As an example, consider a data gathering system for use with automatic vending machines. In such a system, vending machines are placed at many remote locations. Goods are supplied and coins are collected from these machines periodically at suitable intervals. When supplying goods and collecting coins, the person in charge has to gather administrative data such as the number of articles sold, total sales, quantities of goods supplied, and so forth. The data gather system allows automatic gathering of a good deal of administrative data simply and quickly, thereby saving labor.

A typical data gather system (for gathering administrative data from a plurality of automatic vending machines includes electric or optical coupling means for communicating with the control section of the vending machine. The control section of the vending machine include memory for storing the information to be transmitted. The data gathering device collects data from the memory of the vending machine via its control section. However, this system suffers from a disadvantage in that the data formats and interface conditions for data transmission differs according to the manufacturer of the vending machine, i.e., they are not standardized. Companies which supply goods to automatic vending machines must deal with machines of different manufacturers and, therefore, are obliged to carry several different data gathering devices satisfying different interface conditions and data formats. Such a system is quite uneconomical and impractical.

Thus, from the view point of utility and price, gathering data from automatic vending machines is preferably conducted by a single commercially available portable data gathering terminal. This, however, is difficult to realize because of diversification of the coupling interfaces.

Furthermore, the data exchanging system is not only used for gathering stored data from the automatic vending machine, but is also used to provide vending machine operating input data to the automatic vending machines. For instance, in vending machines for brewing coffee, the amount of coffee bean, cream, sugar, and density of brewing coffee must be precisely selected. Therefore, this information should be manually provided to the control device of the coffee vending machine. However, the operation for providing the vending machine with information representing suitable data is complicated and time consuming.

SUMMARY OF THE INVENTION

It is a primary object of this invention to provide a data exchanging system which permits simple and quick exchanging of data between a portable data exchanging device having a portable bar code reader and a plurality of remote machines, such as automatic vending machines.

It is another object of this invention to provide a data exchanging system in which exchange of data is accomplished by an optical signal using a uniform data format, such as a bar code pattern.

To this end, according to the invention, each of the remote machines comprises a data delivery device for converting data to be gathered into an optical signal which resembles the light reflected by a bar code when the bar code is optically scanned. The remote machines also include a data receiving device for converting the received optical signal into an electrical signal and a control device for controlling the operation of the data delivery device and for decoding the received information.

The above and other objects, features and advantages of the invention will become clear from the following description of the preferred embodiment when read in conjunction with the accompanying drawings.

DETAILED DESCRIPTION

Figure 1:
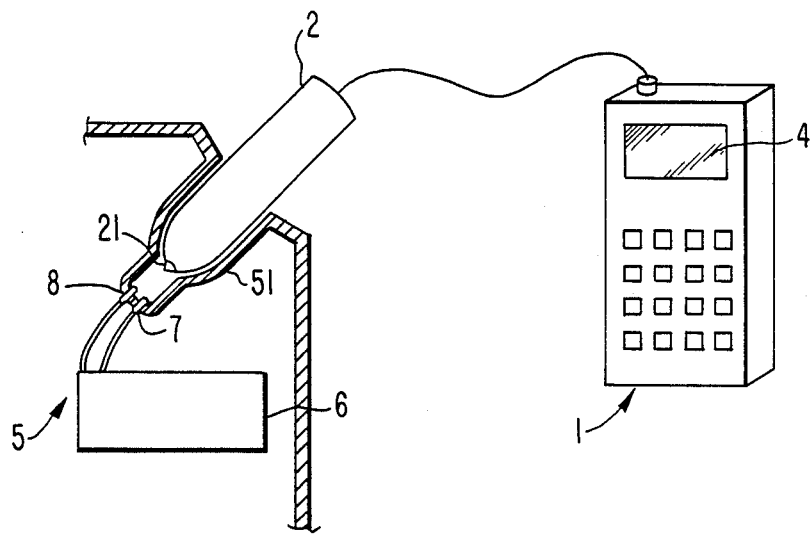
FIG. 1 is an illustration of a portable data gathering device and a vending machine which comprise the data gathering system of the present invention.

FIG. 1 is an illustration of the data delivery/receive section of an automatic vending machine optically coupled to a portable data gathering/inputting device, with the main portion of the vending machine itself being omitted. The data delivery/receive section 5 is composed of a control section 6, light emitting section 7 and light receiving section 8. The control section 6 has a built-in memory (not shown) which stores administrative data to be transmitted to or supplied from a portable data gathering device. This data storing method is the same as that used in the conventional system so that detailed description will not be needed.

The data delivery/receive section 5 also has a receptacle 51 for receiving a pen-type code reader 2 connected to the data gathering/inputting device. The light-emitting section 7 and light-receiving section 8, mentioned above, are mounted in receptacle 51. The light-emitting section 7 produces a pulse-width modulated optical signal which resembles the reflected light signal which is obtained when a bar code is scanned by a bar code reader. The light-receiving section 8 receives a pulse width modulated optical signal which resembles the bar code pattern.

The ordinary pen-type bar coder reader 2 emits a light beam through a spherical lens 21 provided on its end. When the bar code is scanned with the spherical lens 21, the light reflected from the bar code is gathers in the bar code reader 2 through the same spherical lens 21 and is converted into an electric signal by a photoelectric conversion section in the bar code reader 2. The construction and operation of the bar code reader and its connected data gathering device are well known. However, in conventional bar code readers the light emitting section disposed within bar code reader 2 is normally active as the bar code is scanned. Conversely, in this invention, the microprocessor of data gathering-/inputting device 1 controls the emitting section of reader 2 such that light transmitted by reader 2 resembles a bar code.

For collecting data from a vending machine, reader 2 is inserted into receptacle 51. In this state, the spherical lens 21 of the bar code reader 2 faces the light-emitting section 7 and light-receiving section 8. Therefore, the optical signals from light-emitting section 7 are collected in bar code reader 2 through spherical lens 21 and are converted into electric signals by means of photoelectric conversion section (not shown) in bar code reader 2. Conversely, the optical signals from the emitting section of reader 2 are provided to the data delivery/receive section 5 through lens 21 and are converted into electrical signals by means of a photoelectric conversion section in data delivery/receive section 5. The bar code reader thereby recovers data represented by the optical signals emitted by light-emitting section 7 or transfers data represented by the optical signals emitted by the emitting section of bar code reader 2.

The optical signal from the light-emitting section 7 or emitting section of reader 2 resembles that obtained by reflecting light from the bar code when the bar code is scanned with a light beam from the bar code reader 2, as will be understood from the following description.

Figure 2:
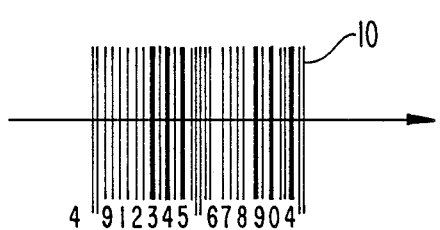
FIG. 2 illustrates an example of a bar code symbol.
Figure 3:
FIG. 3 is an illustration of a portion of the pulse width-modulated electric signal obtained by scanning the bar code symbol of FIG. 2 with a bar code reader.

FIG. 2 shownns an example of the bar code symbol in accordance with the JAN (Japan Article Number) standard. When the bar code 10 is scanned in the direction of the arrow by means of a bar code reader 2, the photoelectric conversion section in the bar code reader produces a pulse-width modulated electric signal, a portion of which is shown in FIG. 3. The photoelectric conversion section includes a binary circuit so that the signal shown in FIG. 3 is converted to a binary-coded digital signal. The data gathering device incorporates a microprocessor which carries out predetermined operations on the digital signal, thereby decoding the information represented by the bar code.

Figure 4:
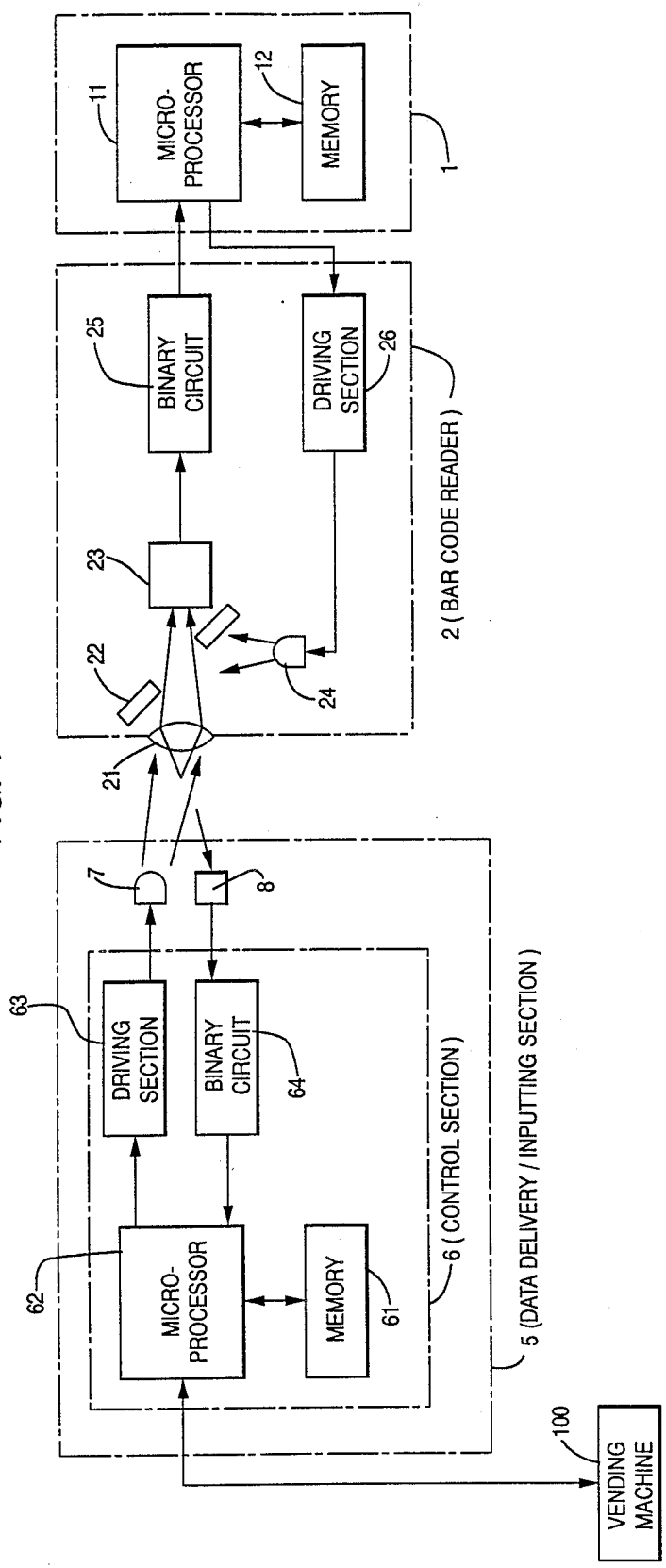
FIG. 4 is a schematic block diagram of a data gathering system embodying the invention.

FIG. 4 is a schematic block diagram of the control section 6 of data delivery/inputting section 5 coupled to a portable data gathering/inputting device 1 via bar code reader 2. The control section 6 includes a memory 61 in which administrative data concerning the vending machine is stored, a microprocessor 62 adapted to read the stored data and carry out predetermined operations on the data, a driving section 63 for switching light-emitting section 7 on and off in accordance with the pulse-width modulated electrical signal from microprocessor 62, and a binary circuit 64 for converting a pulse-width modulated electrical signal from light receiving section 8 to a binary coded digital signal for use by microprocessor 62. Microprocessor 62 is adapted to produce, in accordance with the data retrieved from memory 61, a pulse-width modulated electrical signal which resembles the electrical signal obtained through a photoelectrical conversion of the scanning light reflected from the bar code. Microprocessor 62 is also adapted to decode the input information which is converted from a bar code pattern via binary circuit 64. Microprocessor 62 is adapted to communicate with automatic vending machine 100 for gathering administrative data and for transmitting operating information to and from automatic vending machine 100.

Within bar code reader 2, light received from light-emitting section 7 is focused by spherical lens 21 through a central opening in reflector 22 into a photoelectric conversion element 23 so as to be converted into electrical signals. The electrical signals thus obtained are converted into binary signals, via binary circuit 25, for use by microprocessor 11. Memory 12 is coupled to microprocessor 11 for storing data received by portable unit 1. If data recorded in memory 12 must be delivered to data delivery/inputting section 5 of the vending machine, microprocessor 11 retrieves the data and converts it into pulse-width modulated electrical signals which resemble the bar code pattern, as mentioned above. The electrical signals control the turning on and off of emitting section 24 through driving section 26. The optical signal from emitting section 24 is focused on light receiving section 8 through reflector 22 and lens 21. Thereafter, the signal is converted to pulse-width modulated electric signals and provided to binary circuit 64. The transmitted information is thus recorded in memory 61 to be used to control the operation of automatic vending machine 100.

Bar code symbol standards regulate the number and arrangement of white and black bars, so that microprocessor 62 can read one item of information from memory 61, and form the signal to be transmitted to driving section 63 in such a manner that the one item of information corresponds to one bar code symbol. In similar manner, microprocessor 11 can transmit information stored in memory 12 to control section 6.

International bar code symbol standards such as UPC in the U.S.A., EAN in Europe and JAN in Japan are in common use, as well as several other standards such as NW-7, Code 39 and so forth. Ordinary portable data gathering/inputting devices have bar code reading functions and transmitting functions corresponding to respective standards. The control section 6, therefore, has the ability to actuate the light-emitting section 7 according to a selected code standard and to receive the information which is arranged under the selected code standard. This in turn permits a standardization of the interface specification for exchanging data between vending machines and portable bar code readers.

This invention has been described in detail in connection with a preferred embodiment. This embodiment, however, is merely for example only and this invention is not restricted thereto. It will be easily understood by those skilled in the art that variations and modifications can be easily made within the scope of this invention as defined by the appended claims:

I claim:

1. A vending machine comprising a data exchange system for exchanging administrative and operating data between the vending machine and an electrical device, the data exchange system being resident within the vending machine, each vending machine comprising:

data delivery means for converting administrative data of vending machine status in the form of width-modulated electrical pulses to data in the form of width-modulated optical pulses which optical pulses resemble a bar code;

data receiving means for receiving operating data for vending machine operation in the form of width-modulated optical pulses transmitted from other machines and devices and converting the received data to width-modulated electrical pulses; and control means for controlling the operation of said data delivery means and for decoding the width-modulated electrical signals received from said data receiving means, the control means comprising memory means for storing administrative information which is to be transmitted and for storing operating information which has been received.

2. The vending machine of claim 1 wherein said data delivery means comprises a light-emitting element.

3. The vending machine of claim 1 wherein one of said electrical devices comprises a bar code reader.

4. The vending machine of said control means comprises:

data processing means coupled to said memory means for retrieving stored administrative information therefrom and for converting the retrieved information into width modulated electrical signals, and data processing means for being further adapted to receive binary coded data signals representing operating data to be stored in said memory means;

drive means coupled to said data processing means for receiving width-modulation electrical signals and for providing the width-modulated electrical signals to said data delivery means; and binary circuit conversion means for receiving width-modulated electrical signals from said data receiving means and for converting these signals to binary coded electrical signals and providing the binary coded electrical signals to said data processing means.

5. A vending machine comprising a system for exchanging administrative and operating data between machine and an electrical device, each said machine comprising:

memory means for storing administrative data of vending machine status and for storing operating data for vending machine operation;

data transmit means for receiving width-modulated electrical signals and transmitting width-modulated optical signals;

data receive means for retrieving width-modulated optical signals and providing therefrom width-modulated electrical signals;

binary circuit means for converting the width-modulated electrical signals received from said data receive means into binary coded digital signals; and data processing means coupled to receive the binary coded digital signals from said binary circuit means and adapted to store operating information transmitted thereby in said memory means, said data processing means being further adapted to retrieve administration information stored in said memory means and convert the retrieved administration information to width-modulated electrical signals for transmission by said data means.

6. The vending machine of claim 5 wherein said data processing means is adapted to provide width-modulated electrical signals which resemble a bar code pattern to said data transmit means.

7. The vending machine of claim 5 wherein said binary circuit means is adapted to provide binary coded digital signals from width-modulated electrical signals resembling a bar code pattern.

* * * * *